(12) United States Patent
Kruer et al.

(10) Patent No.: US 11,235,409 B2
(45) Date of Patent: Feb. 1, 2022

(54) METHOD AND APPARATUS FOR FABRICATION OF ARTICLES BY MOLTEN AND SEMI-MOLTEN DEPOSITION

(71) Applicant: +Mfg, LLC, Edgewood, KY (US)

(72) Inventors: Thomas R. Kruer, Edgewood, KY (US); James Blackwood, Florence, KY (US)

(73) Assignee: +Mfg, LLC, Erlanger, KY (US)

( * ) Notice: Subject to any disclaimer, the term of this patent is extended or adjusted under 35 U.S.C. 154(b) by 1225 days.

(21) Appl. No.: 14/518,121

(22) Filed: Oct. 20, 2014

(65) Prior Publication Data

US 2015/0108095 A1 Apr. 23, 2015

Related U.S. Application Data

(60) Provisional application No. 61/892,526, filed on Oct. 18, 2013.

(51) Int. Cl.
| | |
|---|---|
| *B23K 9/04* | (2006.01) |
| *B23K 9/173* | (2006.01) |
| *B23K 9/167* | (2006.01) |
| *B23K 9/23* | (2006.01) |
| *B33Y 10/00* | (2015.01) |

(Continued)

(52) U.S. Cl.
CPC ............. *B23K 9/044* (2013.01); *B23K 9/167* (2013.01); *B23K 9/173* (2013.01); *B23K 9/1735* (2013.01); *B23K 9/23* (2013.01); *B23K 2103/10* (2018.08); *B33Y 10/00* (2014.12); *B33Y 30/00* (2014.12)

(58) Field of Classification Search
CPC ........ B23K 9/044; B23K 9/167; B23K 9/173; B23K 9/1735; B33Y 10/00; B33Y 30/00

USPC ...................... 219/74, 76.1, 76.14
See application file for complete search history.

(56) References Cited

U.S. PATENT DOCUMENTS

| | | | |
|---|---|---|---|
| 2,299,747 A | 10/1942 | Harter | |
| 3,586,812 A * | 6/1971 | Fisher | H01J 37/16 219/121.12 |

(Continued)

FOREIGN PATENT DOCUMENTS

| | | |
|---|---|---|
| EP | 1245322 A1 | 2/2002 |
| EP | 1051536 B1 | 7/2003 |

(Continued)

OTHER PUBLICATIONS

From the International Searching Authority, "Written Opinion of the International Searching Authority", dated Jan. 27, 2015 (Jan. 27, 2015), pp. 1-11.

(Continued)

*Primary Examiner* — Dana Ross
*Assistant Examiner* — Ayub A Maye
(74) *Attorney, Agent, or Firm* — R. Christian Macke

(57) ABSTRACT

A method and apparatus for depositing metals and metal-like substances in two and three dimensional form without a substrate in a safe, rapid and economical fashion using gas shielded arc welding equipment and programmable robotic motion. The method and apparatus includes the use and application of robotic controls, temperature and position feedback, single and multiple material feeds, and semi liquid deposition thereby creating near net shape parts particularly well suited to rapid prototyping and lower volume production.

29 Claims, 10 Drawing Sheets

(51) Int. Cl.
*B33Y 30/00* (2015.01)
*B23K 103/10* (2006.01)

(56) References Cited

U.S. PATENT DOCUMENTS

| | | | | |
|---|---|---|---|---|
| 5,141,680 | A * | 8/1992 | Almquist | B29C 41/12 |
| | | | | 118/120 |
| 5,207,371 | A * | 5/1993 | Prinz | G05B 19/4099 |
| | | | | 228/125 |
| 5,216,616 | A * | 6/1993 | Masters | B29C 35/08 |
| | | | | 156/272.8 |
| 5,281,789 | A | 1/1994 | Merz et al. | |
| 5,287,435 | A * | 2/1994 | Cohen | B29C 67/007 |
| | | | | 264/183 |
| 5,391,887 | A * | 2/1995 | Murray, Jr. | G21F 5/12 |
| | | | | 250/506.1 |
| 5,572,431 | A | 11/1996 | Brown et al. | |
| 5,733,391 | A * | 3/1998 | Bass | C21D 1/63 |
| | | | | 148/644 |
| 5,746,844 | A * | 5/1998 | Sterett | B22F 3/115 |
| | | | | 148/522 |
| 5,811,055 | A * | 9/1998 | Geiger | B23K 9/0061 |
| | | | | 266/48 |
| 5,837,189 | A * | 11/1998 | Westman | C21D 1/60 |
| | | | | 266/131 |
| 6,046,426 | A | 4/2000 | Jeantette et al. | |
| 6,143,378 | A | 11/2000 | Harwell et al. | |
| 6,144,008 | A * | 11/2000 | Rabinovich | B23P 15/246 |
| | | | | 219/121.64 |
| 6,365,867 | B1 | 4/2002 | Hooper | |
| 6,391,251 | B1 * | 5/2002 | Keicher | B05B 7/14 |
| | | | | 419/7 |
| 6,585,559 | B1 * | 7/2003 | Griffin | B24B 37/04 |
| | | | | 451/28 |
| 6,656,409 | B1 * | 12/2003 | Keicher | B23P 15/246 |
| | | | | 219/121.66 |
| 6,869,559 | B2 * | 3/2005 | Hopkins | B29C 67/0055 |
| | | | | 264/234 |
| 7,073,561 | B1 | 7/2006 | Henn | |
| 7,275,925 | B2 * | 10/2007 | Farnworth | G03F 7/0037 |
| | | | | 425/121 |
| 7,790,074 | B2 * | 9/2010 | Pan | B29C 67/0059 |
| | | | | 264/255 |
| 7,942,987 | B2 | 5/2011 | Crump et al. | |
| 8,851,151 | B2 * | 10/2014 | Frasier | B22C 9/02 |
| | | | | 164/122.1 |
| 2002/0105114 | A1 * | 8/2002 | Kubo | B29C 64/153 |
| | | | | 264/497 |
| 2003/0068518 | A1 * | 4/2003 | Ando | B23K 9/04 |
| | | | | 428/608 |
| 2004/0197493 | A1 * | 10/2004 | Renn | H01L 21/6715 |
| | | | | 427/596 |
| 2006/0226578 | A1 * | 10/2006 | Farnworth | B29C 67/0066 |
| | | | | 264/401 |
| 2009/0102098 | A1 * | 4/2009 | Adams | B22F 3/1055 |
| | | | | 264/401 |
| 2009/0130334 | A1 * | 5/2009 | Choy | C01B 13/14 |
| | | | | 427/553 |
| 2010/0100222 | A1 * | 4/2010 | Skubic | B33Y 30/00 |
| | | | | 700/110 |
| 2010/0193998 | A1 * | 8/2010 | Crump | B22F 10/40 |
| | | | | 264/401 |
| 2011/0156304 | A1 | 6/2011 | Walker et al. | |
| 2012/0018924 | A1 * | 1/2012 | Swanson | B29C 47/0014 |
| | | | | 264/401 |
| 2012/0111837 | A1 * | 5/2012 | Al-Mostaneer | B23K 9/0284 |
| | | | | 219/73 |
| 2014/0020575 | A1 * | 1/2014 | Chretien | B30B 15/064 |
| | | | | 101/27 |

FOREIGN PATENT DOCUMENTS

| | | |
|---|---|---|
| EP | 1524049 A3 | 6/2006 |
| WO | 2006133034 A1 | 1/2006 |
| WO | 2012134299 A2 | 4/2012 |
| WO | 2013155500 A1 | 10/2013 |

OTHER PUBLICATIONS

L. Killander, "Future Direct Manufacturing of Metal Parts with Free-Form Fabrication", Annals of the CIRP, vol. 44/1, 1995.

M.L. Grifith, D.M. Keicher, C.U. Atwood, J.A. Romero, J.E. Smugeresky, L.D. Harwell, and D.L. Greene, "Free Form Fabrication of Metallic Components Using Laser Engineered Net Shaping (LENS™)", Proc. of the Solid Free-Form Fabrication Symposium, The University of Texas at Austin, Austin, TX, Aug. 12-14, 1996.

G.K. Lewis, J.O. Milewski, R.B. Nemec, D.J. Thoma, D.A. Cremers, "Direct Light Fabrication—A Laser Metal Deposition Process for Fabrication of Near-Net Shape Components", Los Alamo National Laboratory, Oct. 1997.

F. Klocke, and U. Clemens, "Rapid Tooling Combining Laser Generating and High Speed Milling", Proc. of the 5th European Conference on Rapid Prototyping and Manufacturing, 1996.

P.M. Dickens, M.S. Pridham, R.C. Cobb, I. Gibson, and G. Dixon, "Rapid Prototyping Using 3D Welding", Journal of Design and Manufacturing, No. 3, 1993.

G. Gnirss, "Shape Welding: The Current State of the Art in the Federal Republic of Germany", Welding in the World, 1987.

T.E. Doyle, "Shape Melting Technology", 3rd Intl. Conf. Desktop Manufacturing, 1991.

H.E. Beardsley, and R. Kovacevic, "Controlling Heat Input and Metal Transfer for 3D Welding-Based Rapid Prototyping", Proc. of the 5th International Conference on Trends in Welding Research, Jun. 1-5, 1998, Pine Mountain, GA.

R. Kovacevic, "Rapid Prototyping Technique Based on 3D Welding", Proc. of the 31st CIRP International Seminar on Manufacturing Systems, May 26-28, 1998, Berkley, CA.

Y. Song, S. Park, K. Hwang, D. Choi and H. Jee, "3D Welding and Milling for Direct Prototyping of Metallic Parts", Proc. of the 9th Annual Solid Free-Form Fabrication Symposium, Austin, TX, Aug. 10-12, 1998.

L.E. Weiss, F.B. Prinz, D.A. Adams, and D.P. Siewiorek, "Thermal Spray Shape Deposition", Journal of Thermal Spray Technology, vol. 1, 1992.

R. Merz, F.B. Prinz, K. Ramaswami, M. Terk, and L.E. Weiss, "Shape Deposition Manufacturing", Proc. of the Solid Freeform Fabrication Symposium, Austin, TX, Aug. 8-10, 1994.

J.A. Johnson, N.M. Carlson, H.B. Smartt, and D.E. Clark, "Process Control of GMAW: Sensing of Metal Transfer Mode", Welding Journal, 704, 1991.

Written Opinion of the International Searching Authority for PCT Application No. PCT/US2014/061330, dated Oct. 20, 2014 (10 pages).

International Search Report for PCT Application No. PCT/US2014/061330, dated Oct. 20, 2014 (3 pages).

* cited by examiner

METHOD AND APPARATUS FOR FABRICATION OF ARTICLES BY MOLTEN AND SEMI-MOLTEN DEPOSITION

RELATED APPLICATION

This application claims priority to U.S. Provisional Patent Application Ser. No. 61/892,526 entitled "Method and Apparatus for Fabrication of Articles by Molten and Semi-molten Deposition", filed Oct. 18, 2013, the disclosure of which is herein incorporated by reference in its entirety.

FIELD OF THE INVENTION

The present invention relates to equipment and processes used for the fabrication of parts by depositing layers of metallic material, commonly referred to as additive manufacturing, and more particularly to equipment and processes which fabricate metallic items formerly made by processes such as casting, welding, subtractive machining, and forging, and generally does so without the need for specialized tooling and long lead times associated with these manufacturing processes.

BACKGROUND OF THE INVENTION

Fabrication of three-dimensional metal articles by deposition of successive layers of metallic powder or weld beads, where the layers are heat bonded together to build the object, is well known in the field.

Processes using plasma or laser fused deposited metals have been used for many years to produce a layered structure on a substrate, but are typically very energy intensive and extremely slow. The required equipment is expensive to purchase and operate as a high energy plasma generator is needed to vaporize the powder stream or high energy laser beam is needed to generate the melt-pool on the growth surface.

Similarly, processes using energetic wire deposition enable the rapid prototyping and manufacture of fully dense, near-net shape components on a substrate. However, the deposition must be done slowly to allow each layer to cool prior to the next layer being added. In addition, the resulting items produced by these deposition methods often require the removal of the substrate as a secondary operation, which can increase the cost, destroys the substrate when being removed, can damage the object from which the substrate is being removed, or require careful engineering to incorporate the substrate into the structure of the item being manufactured, thereby limiting the configurations that can be produced.

The bonded layers from these current processes are sometimes milled to a final shape either after each layer is formed, or after all layers have been made. Those knowledgeable in the art accept that parts fabricated using this welding method, are either small—due to the large amount of heat inputted through the welding process- or extremely expensive due to the long time needed to fabricate them.

Sintered metal processes use powdered materials and a high power laser beam to selectively melt the powdered material, layer upon layer. Although relatively accurate, these processes are also slow and require a high temperature post processing operation to obtain a usable part. Even after post processing, the resulting part has the physical properties of a sintered metal part rather than being homogeneous. Furthermore, post processing can result in significant distortion and the required equipment is expensive. Laser melting of powered materials can be used and thus eliminate the need for oven post heating, but are even slower due to the increased heat.

These processes used to fabricate three dimensional metallic items by adding layers of material have many disadvantages. Similarly, processes such as casting and forging require large investments in tooling and equipment and thus fundamentally suited only for large volume production Processes such as welding are generally labor intensive, require highly skilled personnel and require a great deal of pre-assembly preparation and post assembly finishing. In addition, these processes typically require long periods of time to complete the production of a single part due to all the drawings and preparation required for the individual components. What is needed, therefore, is a method and apparatus to reduce the amount of capital equipment investment, process expense, and time needed to fabricate a 3 dimensional part, including the amount of time needed to form the part and the amount of time to finish the part for final use.

SUMMARY OF THE INVENTION

A method of and apparatus for depositing metals and metal-like substances in three dimensional form in a rapid and economical fashion is herein disclosed, such that the new process satisfies an unmet need of single and smaller volume production in creating near-net shape parts, and providing an avenue to limited production heretofore unavailable, while not precluding its use in large volume production as well. As described herein, the new process of the present invention can form a metal part or a metal-like part comprising a composite including a metallic material, a combination of different metallic materials, a ceramic material, and components of various other materials.

The present invention uses modified gas shielded arc welding equipment referred to as GMAW (Gaseous Metallic Arc Welding) and also known as MIG (Metallic Inert Gas). It can also use TIG (Tungsten Inert Gas) processes and apparatus in the same embodiment. The MIG or TIG welding torch is mounted onto a multiple axis robotic mechanism to automatically deposit one or more metals in layers according to the part design while simultaneously heating or cooling the resulting built-up structure to achieve a faster deposition of material and to maintain and improve dimensional accuracy.

The metal-like part exhibits some metallic properties while not being entirely made of a metal. In one embodiment, the metal-like material is provided as a feedstock by enclosing the non-metallic components within a tube of metal. While some currently known MIG welding wire uses a tube of metal surrounding a flux core, a metal-like feedstock as used herein, in one embodiment, includes a tube of metal having a core other than a flux core.

In addition, a method is disclosed whereby a metallic three dimensional item is produced without the need of being permanently attached to a preform or substrate during the manufacturing process. The resulting part does not require removal of a difficult to remove substrate, to provide a near-net-shape part requiring no further removal of structure.

The present invention provides, in different embodiments, an object, part or item which does not include a permanently attached base or substrate. As discussed herein, the build table upon which the object is formed is removably adhered to the object, such that the object remains fixed to the build table during forming of the part, but is removable from the build table without significantly altering the form of either the part or the build table. Consequently, the build table is reusable to form additional objects of the same or different sizes or different designs.

In one or more embodiments of the present invention, there is provided a method and apparatus to rapidly produce one or more parts to be used in place of castings, weldments, and forgings, while eliminating the need for tooling or molds to produce the part.

In one or more embodiments of the present invention, there is provided a method and apparatus to provide a near net shape part with optimum dimensional accuracy. As used herein, a near net part is a part produced by a manufacturing process which is close to a finished part. The near net shape part requires a minimal amount of after-part finishing processing typically a limited and controlled material removal process and polishing, if necessary.

In one or more embodiments of the present invention, there is provided a method and apparatus configured to control the built in stresses in the part, so that the desired physical material properties of the part are obtained.

In one or more embodiments of the present invention, there is provided a method and apparatus configured to control the grain structure of the material in the part, so that the desired physical material properties of the part are obtained. In one or more embodiments, a submerged deposition process takes place below the top surface of the quenchant which provides properly controlled parameters, wherein the quenchant fluid and decomposition byproducts are excluded from the hot zone primarily by the action of mechanical shielding, shield gas, and deposition byproduct outflow. An inverted process allows gravity to assist in shielding the hot zone.

In one or more embodiments, a means of determining the temperature of the quenchant at a predetermined distance from the part as a means of temperature direction and control is provided. Such means of monitoring temperature includes optical monitoring or sensor based monitoring.

In one or more embodiments of the present invention, there is provided a method and apparatus configured to control and prevent an outflow of molten material from a hot zone wherein material is being deposited in a deposition, or hot zone, where the material is still molten or semi-molten.

In one or more embodiments of the present invention, there is provided a method and apparatus configured to control and prevent a plastic flow or sag of deposited material in and adjacent to the hot zone.

In one embodiment, the part is deposited layer by layer on a build table of copper, copper clad, or other suitable metallic material to provide the electrically conductive surface. In a second embodiment, the deposition is made using at least two wires of differing polarities to allow for the initial layer to be deposited on either a platen of metallic surface or a non-metallic surface such as a ceramic table. The use of the two wire approach also minimizes the heat input to the structure being fabricated and the energy needed to produce it. This reduced energy input allows the part to be fabricated more quickly. In this two wire embodiment, the material is deposited in a range of temperatures that include the material's temperature in plasma, molten and semi-molten states.

Generally, the semi-molten state is used during a first pass in order to produce a continuous initial deposition surface or trace partially adhering to the surface of the platen, such adhesion being sufficient to prevent lifting of said trace during subsequent passes, but insufficient to preclude easy removal of the completed item or part, said adhesion being achieved by adjustment of deposition parameters and selection of suitable platen materials for the type materials being deposited. Suitable platen materials include heat resistant conductive and non-conductive materials and are capable of being temperature controlled by the quenchant fluid.

In different embodiments, the deposition process benefits from a light dusting of a metallic powder on the surface of the platen to ensure electrical conduction.

In one or more embodiments of the present invention, there is provided a method and apparatus configured to provide a safe environment for an operator and to control the unrestricted discharge of process byproducts. Byproducts are removed and processed by conventional means if desired, as is well known in the field of welding and other manufacturing processes.

In one or more embodiments, a gas sensor is provided to monitor the presence of undesired atmospheric or by product gasses, as well as a means for controlling the influx of additional shield gasses to exclude the atmospheric or by product gasses from the deposition zone.

In different embodiments, computer controls are integrated into the other process controls, as is known in the art.

According to one embodiment of the present invention, there is provided an apparatus configured to fabricate a metal or metal-like object including a deposition head configured to deposit a metal or a metal-like material and a multi-axis robotic system. The multi axis robotic system is configured to support the deposition head and is further configured for movement in a first plane. A build table is disposed beneath the deposition head. The build table defines a support surface parallel to a first plane, wherein the build table is configured for independent movement in a first axis substantially perpendicular to the first plane.

According to another aspect of the present invention, there is provided an apparatus configured to fabricate at least one of a metal or metal-like object including a plurality of deposition heads, wherein each of the deposition heads is configured to deposit a metal or metal-like material of a different type and each includes a tool bracket. A multi-axis robotic positioning system includes a head support including a master bracket configured to support the tool bracket of one of the plurality of deposition heads wherein the multi-axis robotic positioning system is further configured for movement in a first plane. A build table is disposed beneath the multi-axis robotic positioning system and defines a support plane, wherein the build table is configured for movement in the first axis independently of movement of the head support in the first axis.

According to still another aspect of the present invention, there is provided a method of fabricating an object formed from a metal or metal-like material on a platen. The method includes depositing a plurality of spots of material on the substrate, wherein each of the plurality of spots is separated from an adjacent one of the plurality of spots of material; depositing a bead of material between each of the adjacent ones of the plurality of spots of material to connect adjacent spots with the deposited bead of material; depositing a continuous bead of material on top of the plurality of spots of material and the beads of material between adjacent ones of the plurality of spots; and successively depositing a continuous bead of material on a previously deposited continuous bead of material to complete the fabrication of the object.

DESCRIPTION

Figure 1:
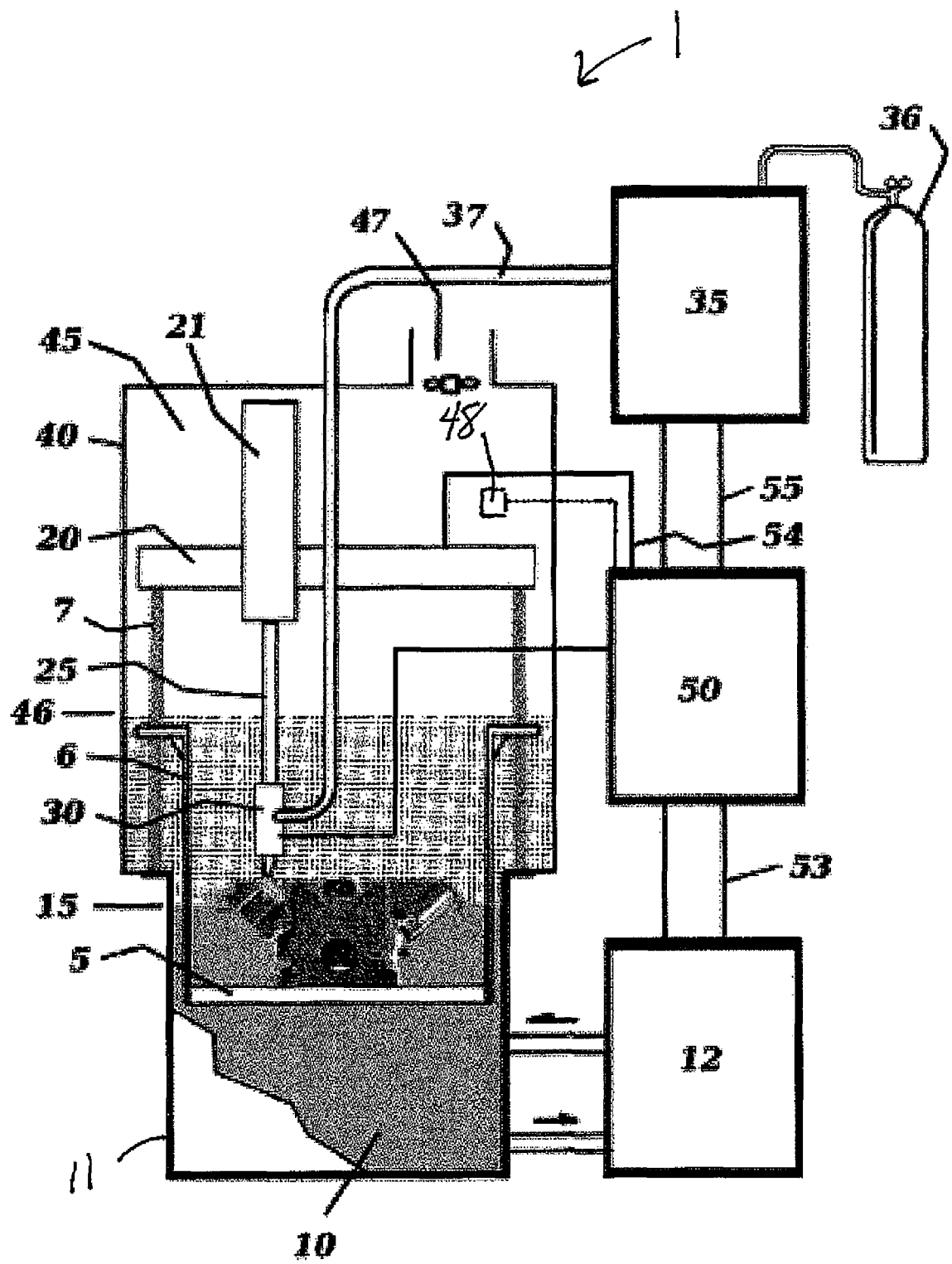
FIG. 1 is a block diagram of the major components and subassemblies of a fabrication system.

The present invention is directed to the fabrication of an object using three-dimensional computer models and computer numerical control (CNC) robotics to control the position of the application of a metal or metal-like deposit. The present invention is directed to form a metal-based or metallic two or three dimensional object, as contrasted with known three dimensional plastic printing technologies in use today for providing objects made of plastic. The fabrication of these objects formed of metal does not require the use expensive tooling or molds. Additionally, the present invention is particularly well suited to rapid prototyping and lower volume production of metallic parts.

In one or more embodiments, the apparatus includes an inert gas arc nozzle fed with wire and gas, a non-stick build surface mounted to a moving table, a multi-axis robotic actuators, a master controller, sensors, a tank full of quenchant, an enclosure, and an air filtering system.

At least one distance sensor, or alternatively, electronic arc length sensing, as currently employed by welding manufacturers such as Lincoln, Fronius, Miller, ESAB etc, continuously monitors the height of the previously deposited metallic layer and compares the actual height of the pervious layer to the specified height. If any section of the layer is lower than specified, the system can go back and fill it prior to starting the new layer, or the speed of deposition can be modified to deposit additional material at the low section.

A temperature monitoring means and simultaneous partial submersion of the part in a bath of quenchant fluid while building layers is used to heat or cool the part as each new layer is deposited in the one or more embodiments. This feature allows control of built in stresses as well as manipulation of the final grain structure and material properties. The supplemental control of part temperature, near but not coincident with the hot zone of the deposition, provides fine control of item characteristics including the ability to prevent outflow of deposited material from the vicinity of the hot zone and to preclude plastic flow or sag adjacent to the hot zone. In some embodiments, submersion in a bath of quenchant fluid as a means of heat control is advantageous over a spray or a quenchant cascade, as liquid does not remain on the surface to which material is being deposited during the next pass nor is liquid introduced into the hot zone. Consequently, the risk of steam, hydrogen and oxygen production which can cause embrittlement or porosity is thereby reduced or eliminated.

The present invention provides a safe environment for the operator and controls the unrestricted discharge of process byproducts by providing an enclosure to trap toxic fumes generated during the deposition process. The enclosure also retains the inert gas used to shield the welding arc from undesired atmospheric gases, so that less inert gas is needed. In addition, the inert gas within the enclosure, in different embodiments, is purged and reused for the next part.

As depicted in FIG. 1, a fabrication system 1 includes a Build Table 5 acting as a support for the part being fabricated. The Build Table 5 is supported by Build Table Supports 6 and is raised or lowered by way of Build Table Height Actuators 7 into a bath of quenchant Fluid 10, which is contained in a tank 11. As illustrated, the actuators 7 are located outside the quenchant fluid 10 and the tank 11 such that the actuator and the support are not immersed in the fluid. In this embodiment, the actuators 7 are located within an enclosure 40. The temperature of the quenchant Fluid 10 is maintained by a Temperature Control Unit 12. A quenchant Level 15 is maintained at a monitored, fixed position so that the Build Table 5 and a portion of the fabricated part are cooled or heated, as discussed herein. As used herein, the term "build" is used to refer to a part being produced or "built". In one or more embodiments, the quenchant fluid 10 includes a quenchant configured to cool the object being formed on the build table 5.

A multi-axis Robotic Actuator System 20 is positioned above the Build Table 5. The Robotic Actuator System 20 includes at least one Z Axis Actuator 21 which moves a Z Axis Rod 25 vertically, as illustrated, relative to the Build Table 5. A Deposition Nozzle Module 30 is attached to the end of the Z Axis Rod 25 and is connected to a Deposition Power Supply 35 and a supply of Inert Gas 36 by way of a Welding Tether 37. The described welding and deposition equipment is familiar to those knowledgeable in MIG or TIG welding processes, but modified to deliver much lower power and very different waveforms than typically used for welding applications. The inert gas 36 is also known as a shield gas.

The Build Table 5, bath of quenchant Fluid 10, Robotic Actuator System 20, and Deposition Nozzle Module 30 are all contained within an Enclosure 40. In one or more embodiments, the Enclosure 40 creates a controlled Enclosed Space 45 for the process which is isolated from outside temperature variations and air currents. The inert gas is contained within the Enclosed Space 45 and maintained at a desired Inert Gas Level 46, thus minimizing the chance of contamination of the material being deposited to form the part. While the inert gas level 46 is shown as a clearly defined gas level, this level is for illustrative purposes only. During operation of the system 1, the gases present in the enclosure 40 intermix, with the level of shield gas being determined by the concentration of the mixture rather than a physical level as shown.

The byproducts generated by the process are also contained in the Enclosed Space 45 and in or more embodiments the byproducts are vented by way of a Vent Fan 47 to appropriate filters, scrubbers or environmental controls in order to ensure operator safety. An oxygen sensor 48 is operatively connected to the controller 50 to monitor and control the level of oxygen gas within the chamber. If the chamber is determined to have too much oxygen gas, or not enough inert gas, the controller 50 delays the start of the deposition process or turns off the system, so that repairs or adjustments can be made.

In another embodiment, the sensor 48 is used to provide for a reduction of shield gas during material deposition. The higher the concentration of shield gas in the chamber, the lower the requirement for shield gas input at the nozzle. Initially the chamber contains normal air, with that air being excluded from the deposition zone by the shield gas being input present at the nozzle. In other optional operating settings, normal air is completely removed from the chamber and the chamber is filled with a shield gas before beginning the formation of the part.

In one or more embodiments, the enclosure 40 is a sealed container in which an inert gas, such as carbon dioxide, or argon, or a selected mix of inert gases is used in the part forming process. The enclosure 40 is coupled to a gas circulation system (not shown) as would be understood by those skilled in the art. The inert gas, such as carbon dioxide and argon are removed and trapped from the air and reused in the enclosure 40.

A central Computer Controller 50 is connected to all subassemblies of the apparatus by means of a Temperature Control Cable 53, a Robotic Control Cable 54, and a Deposition Power Supply Control Cable 55. The Computer Controller 50 has master control over each of the subsystems along with control over the entire process, as described below.

Figure 2:
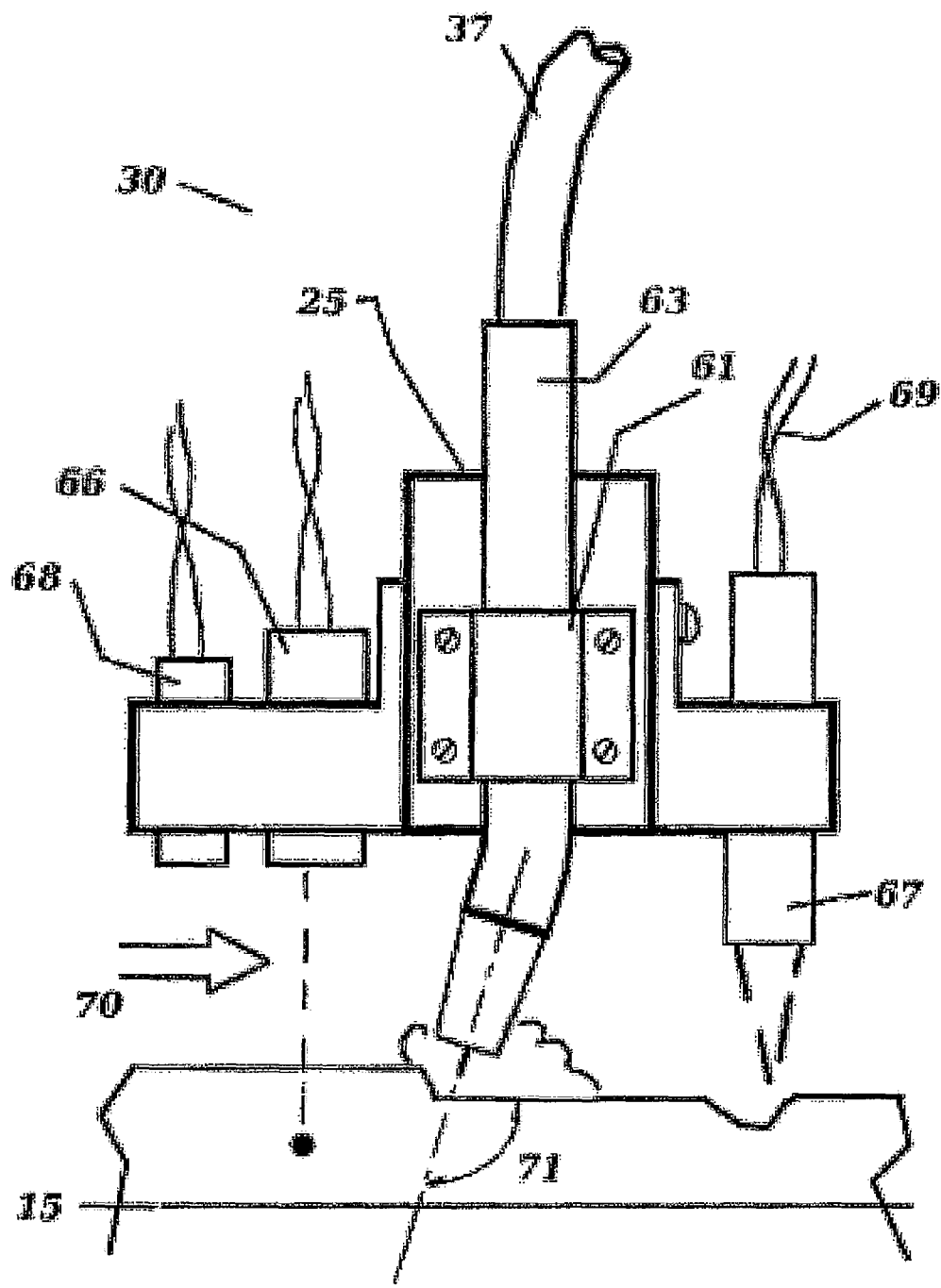
FIG. 2. illustrates a deposition nozzle module of the present invention.

As depicted in FIG. 2, the Deposition Nozzle Module 30 incorporates a Holding Device 61 for securing a Deposition Nozzle Assembly 63 as well as the Welding Tether 37. A Part Temperature Sensor 66, an Electronic Height Gauge 67, and a Gas Monitoring Probe 68 are also mounted to the Deposition Nozzle Module 30 so that all supported components remain in the same relational position as they move together. These sensors are connected to the Computer Controller 50 by way of a Nozzle Module cable 69. It is important to note that the Part Temperature Sensor 66 is positioned and oriented so that it can accurately measure the temperature of the part at some preset distance between the top of the part, where the new materials layer is being deposited, and the build table or quenchant Level 15.

The Electronic height gauge 67 determines if any areas of the part are lower than desired. Optionally, in one or more embodiments, additional height sensors are mounted to ensure that the top of the part is in the correct position as determined by the height of the build table 5 with respect to the nozzle module 30. It is known in the art that the Robotic Actuator System 20, in different embodiments, include multiple axes and thus allow manipulation of more than one Deposition Nozzle Module 30. Multiple Deposition Nozzle Modules 30 allow for faster deposition rates or deposition of two materials at the same time. In one or more embodiments where the nozzle assembly 63 incorporates a MIG welding head, the welding head is inputting heat during formation of the part with up to 7,000 watts of power.

The typical Direction of Travel 70 for the Deposition Nozzle Module 30 is depicted. An angular orientation 71 of the nozzle relative to the part is employed for the purposes of maximizing deposition rate and minimizing heat buildup while narrowing the spread of the deposited material. This angular orientation 71 is not an essential element of the invention, but is shown for clarity and as an illustration of established practice. In this case, an additional rotational element would be added to the nozzle as is already common in the art to enable omnidirectional movement. In one or more embodiments, feed wire is used to provide material for the build-up of the item being produced, and the wire discharge means can be a MIG nozzle, TIG feed wire dispenser, or any similar means available to the art. Feed wire provides advantages over powdered metal for cost, environmental, and safety reasons.

Figure 3:
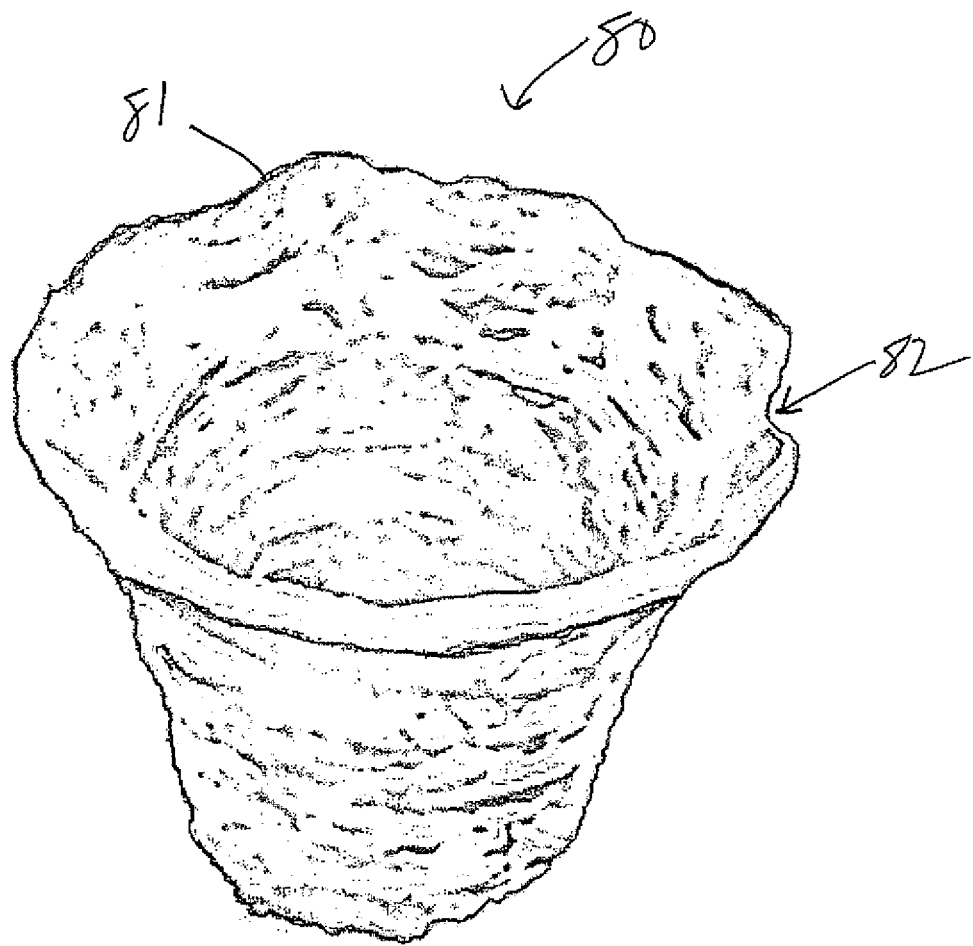
FIG. 3. illustrates a prototype part made by an embodiment of the present invention.

The sample part 80 depicted in FIG. 3 was made without use of the quenchant Fluid 10. The uneven Top Surface 81 of this sample part, which includes sag 82, illustrates how improper cooling results in a part which lacks dimensional stability during fabrication and which includes unwanted defects. The teachings of the present disclosure, in contrast however, provide a dimensional stability of the part which, in some cases, reduces the amount of after-processing needed finish a part or the number of dimensionally inaccurate parts.

Prior to operating the apparatus, a 3D solid computer model of the desired part is sliced into virtual layers and saved into an electronic file (not shown). This electronic file is then entered into the Computer Controller 50 of the apparatus. At the start of operation of the apparatus, a set of commands from the Computer Controller 50 causes the Build Table 5 to be initially positioned in or above the quenchant Level 15 and the Robotic Actuator System 20 and the Z Axis Actuator 21 to position the Deposition Nozzle Module 30 at a starting point and a predetermined optimum distance above the Build Table 5. The Enclosure 40 is optionally filled at this time with the Inert Gas 36, by turning on the flow or re-introducing gas which was saved from previous runs.

After checking and confirming that the environment within the Enclosure 40 is being maintained at proper operating conditions by way of the oxygen sensor 48, the Computer Controller 50 turns on the Deposition Power Supply 35 and the flow of the Inert Gas 36. Feed wire is delivered to the nozzle and an arc is struck. The first layer of the part is deposited onto the Build Table 5 according to the profile in the sectioned 3D model file. Subsequent layers, as determined by the 3D solid computer model and the virtual layers thereof, are deposited to form a complete part.

The speed, power settings, and direction of the material deposition are determined by preloaded parameters within the Computer Controller 50. Since the temperature sensor 66 is mounted as part of the nozzle module 30, the temperature sensor 66 is adjacent to the location of the deposition of material, i.e. the deposition or hot zone, and records the instantaneous temperature at a set distance from the deposition or hot zone. This data is received by the controller 50 and used in a computer modeling of an overall part temperature. For example, upon completion of a layer, the average temperature of an aluminum part is read using readings from the temperature sensor 66 and the Build Table 5 is lowered or raised to cool or heat the part to a desired temperature prior to moving on to deposition of the next layer. The build can be delayed or slowed down if the part is not within an acceptable temperature range, and thus ensure one or more of: 1) proper bonding between layers, 2) prevention or reduction of part sagging from addition heat input, 3) obtaining the desired material grain structure, and 4) achieving desired physical properties. Also, under the right conditions, the build is continuous and includes one, homogeneous material including the transition from layer to layer. Travel speed control is, therefore, an additional parameter which, can be used to control part temperatures. As is known in the art, distortion control in forgings, castings and thin sheet metal parts as well as minimal residual stresses in forgings and castings can be achieved by hot water quenching using hot water or water/polyalkalene glycol mixtures.

Movement of the build table 5 is combined with movement in the Z axis of the Z Axis Rod 25 and is controlled by the controller 50 to vary the distance between the quenchant and the hot zone of the part while keeping the deposition parameters constant. Therefore, the distance between the hot zone and the quenchant level 15 and the portion of the part submerged, is continuously varied based on instantaneous temperature readings, or is varied based on a model of overall part temperature and varied in discrete steps as desired.

The temperature of the part as measured by the small single point temperature sensor 66 is received by the controller 50 and is used to determine an average temperature over time, as the nozzle assembly 63 moves along the path to deposit the material. In this embodiment, a line can also be used for the temperature sensor, to achieve some mechanical averaging of the signal sent to the controller. In either case, the controller 50 is configured to use the received temperature values to average the temperature over time as would be understood by those skilled in the art.

During the deposition of each subsequent layer, the Z Axis Actuator 21 positions the Deposition Nozzle Module 30 at a predetermined height from the top of the part, as predetermined by previous experimental testing of the apparatus. The Electronic height gauge 67 determines if any areas of the part are lower than desired. In another mode of operation, the arc provided by the nozzle assembly 63 is used to obtain a localized visual reference point corresponding to the height of the part being formed.

The build is correctable by going back over the low sections, changing speed and deposition parameters, or aborting the process if the part height or position is found to be out of an acceptable tolerance.

Note that it is envisioned that the X-Y starting point for each layer, is moved slightly relative to a previous starting point of the previous layer, so that there is minimal effect from the transient deposition during arc start up. Furthermore, material deposition proceeds along a continuous path without interruption to minimize the number of starting points.

In an alternate operating mode, the use of an analysis of deposition voltages, currents, and other deposition supply characteristics which are affected by the deposition process, are used to monitor height. Common in the welding industry is the use of voltage monitoring to determine arc length and "stick out" which is the length of wire protruding from a MIG nozzle during a welding operation. With a known distance for arc length, a known Deposition Nozzle Z axis position, and a known "stick-out", dynamic determination of material height in the deposition zone is a simple subtraction operation. This result is then be used to control the deposition rate, robotic motion speed, and maintain optimal build height either in conjunction with height sensor 66 and other sensors or as a standalone control.

In one or more embodiments of the present invention, the wire used in forming the part is a standard MIG welding wire but having a reduced amount of silicon. A typical silicon concentration for a currently available E70 MIG wire is in the range of 0.5-0.9% SI. In one or more embodiments for use herein, the feedstock wire includes a silicon level of approximately 0.2% or below SI.

Given that the Inert Gas 36 is typically heavier than air, the inert gas 36 tends to sink to the bottom of the Enclosure 40. The Inert Gas Level 46 is continuously monitored so that the deposition process is always performed in an inert gas environment. Furthermore, monitoring of other, undesirable gases, such as hydrogen near the deposition site, is performed to help ensure optimum conditions for the metal deposition process. In this way, porosity, material embrittlement, and other deposition flaws are reduced or avoided resulting in a part that has the desired mechanical properties.

Once the last layer is deposited and the part is therefore completed, the inert gas is purged from the enclosed space with the Vent Fan 47 and through a filter to clean the air of undesirable fumes. The Deposition Nozzle Module 30 is moved out of the way by the Robotic Actuator System 20 and the build table 5 is raised out of the quenchant 10 to allow the part to be unloaded from the apparatus. At least one door in the enclosure 40 provides access to remove the completed part.

Figure 4:
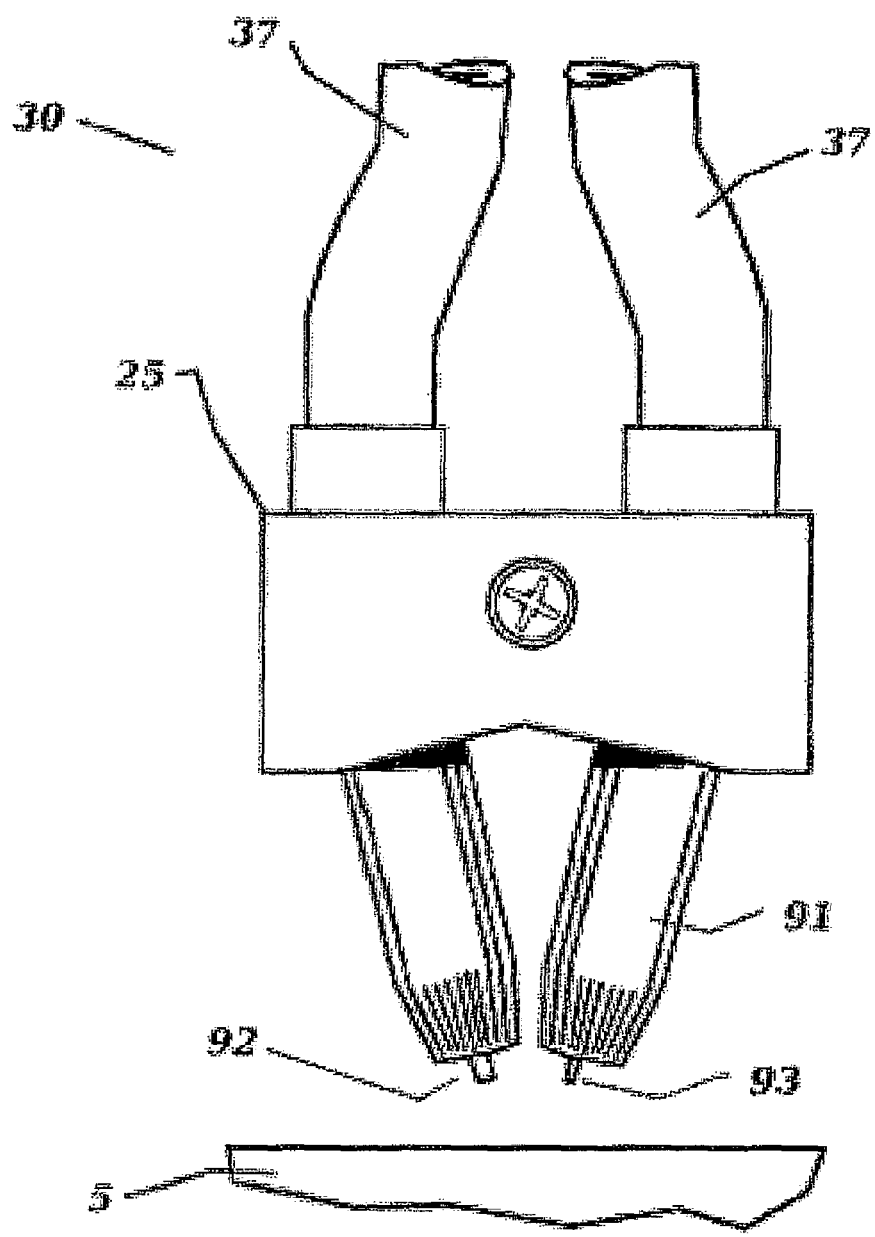
FIG. 4. illustrates a two wire deposition device of the present invention.

FIG. 4 illustrates the optional use of two MIG Welding Nozzles 91 to rapidly deposit metal without the need for a conductive Build Table 5. Either an AC waveform or DC− polarity is provided by one Large Feed Wire 92 and DC+ polarity is provided by another Small Feed Wire 93. In one or more embodiments, other combinations of waveforms optimized to achieve, in one or more embodiments the semi-molten state of the Large Feed Wire 92 are provided. The size of the wires and the relative speed of the wire feeds are set in conjunction with the waveforms, voltages, currents and polarities so that the Small Feed Wire 93 softens the Large Feed Wire 92 but does not completely melt it to the "droplet" stage. Thus, the Large Feed Wire 92 is then able to be laid down in a semi-molten state to make the first pass, with no need for conduction through the Build Table 5. After the first layer is deposited, the waveforms are switched so that one or both of the wires produces fully molten droplets on the subsequent passes in order to help minimize the heat input to the part and to optimize bonding and other deposition qualities.

Varying the heat input and the quenching affects the material properties in the deposited material, as well as providing control over warpage tendencies. As depicted, the deposition nozzles are angled towards each other so that the Large Feed Wire 92 and Small Feed Wire 93 intersect at a convenient distance above the build table 5. Practitioners in the art will readily recognize that the relationship between an included angle between the deposition nozzles and the height above the build table 5 allows for variations in order to achieve optimum results and either or both angles are varied as needed.

Figure 5:
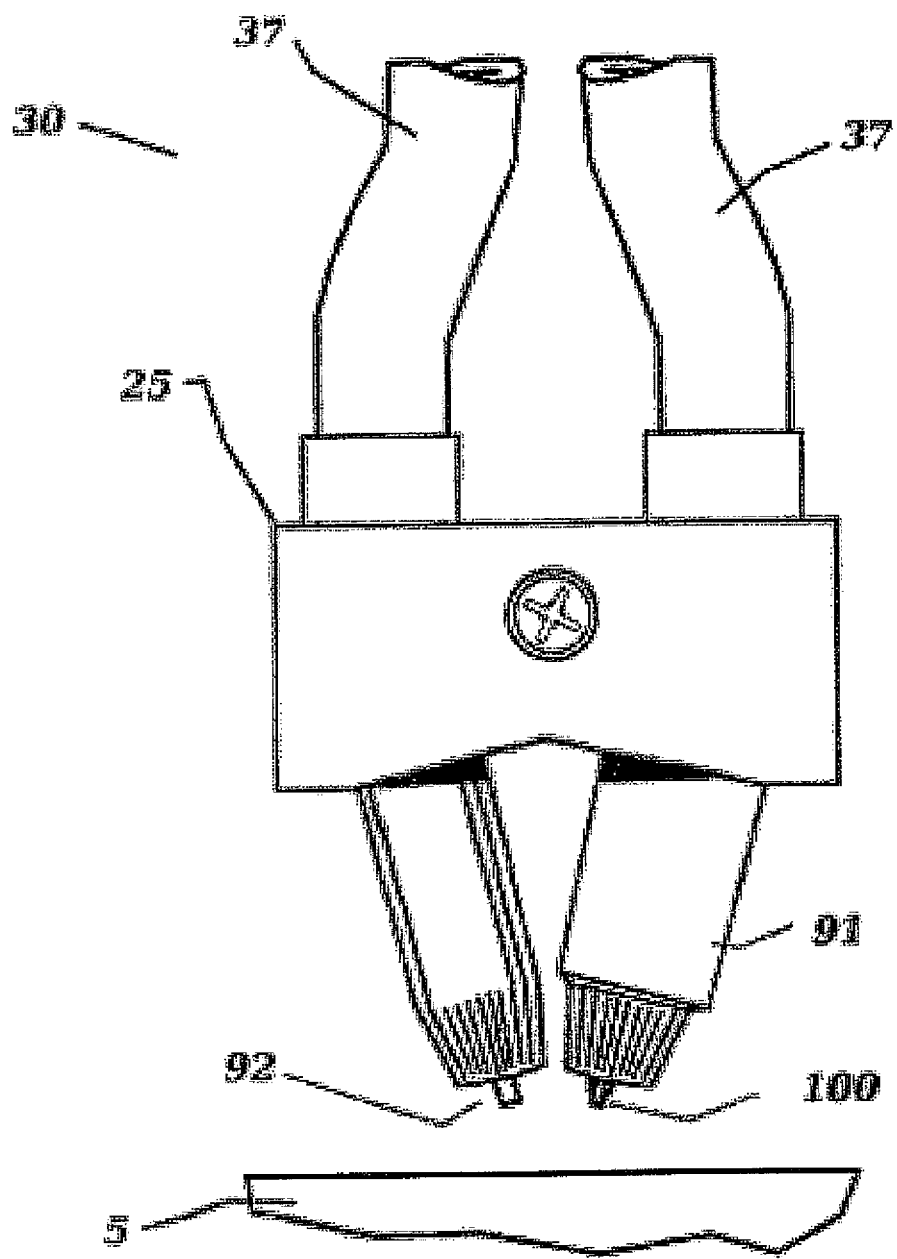
FIG. 5. illustrates an alternative two wire deposition device of the present invention.

FIG. 5 illustrates an alternate embodiment which substitutes a non-consumable TIG Electrode 100 for the Small Feed Wire 93 in the above embodiment, such as is commonly used in Tungsten Inert Gas (TIG) welding. In this embodiment, the TIG Electrode 100 is used to soften the Large Feed Wire 92 to allow deposition of the material, allowing switching of current between the TIG Electrode 100, the MIG Large Feed Wire 92, and the Build Table 5 if a metallic build table surface is used. This allows controlling the initial deposition as well as subsequent passes by using suitable configurations of currents for each purpose.

It should be understood that a combination of a Large Feed Wire 92, a smaller wire and a TIG electrode, or more than one wire of equal or different diameters might be used to practice the invention, or that a single wire with a TIG Electrode 100 might be used to deposit material onto the Build Table 5 as initially described herein in lieu of feeding current through the feed wire and using a typical MIG process.

In the one or more embodiments, regardless of the type of nozzle or nozzles installed, the size of the feedstock wire and the relative speed of the wire feeds are determined in conjunction with the waveforms, voltages, polarity, and currents to be used by the deposition nozzles. It should be noted that the first pass requires different settings than subsequent passes and on subsequent passes after the first pass, the configuration and parameters are such as to create some localized heating of the formerly deposited layer in the deposition zone, either by current flow or by proximity such that acceptable bonding is achieved.

Figure 6:
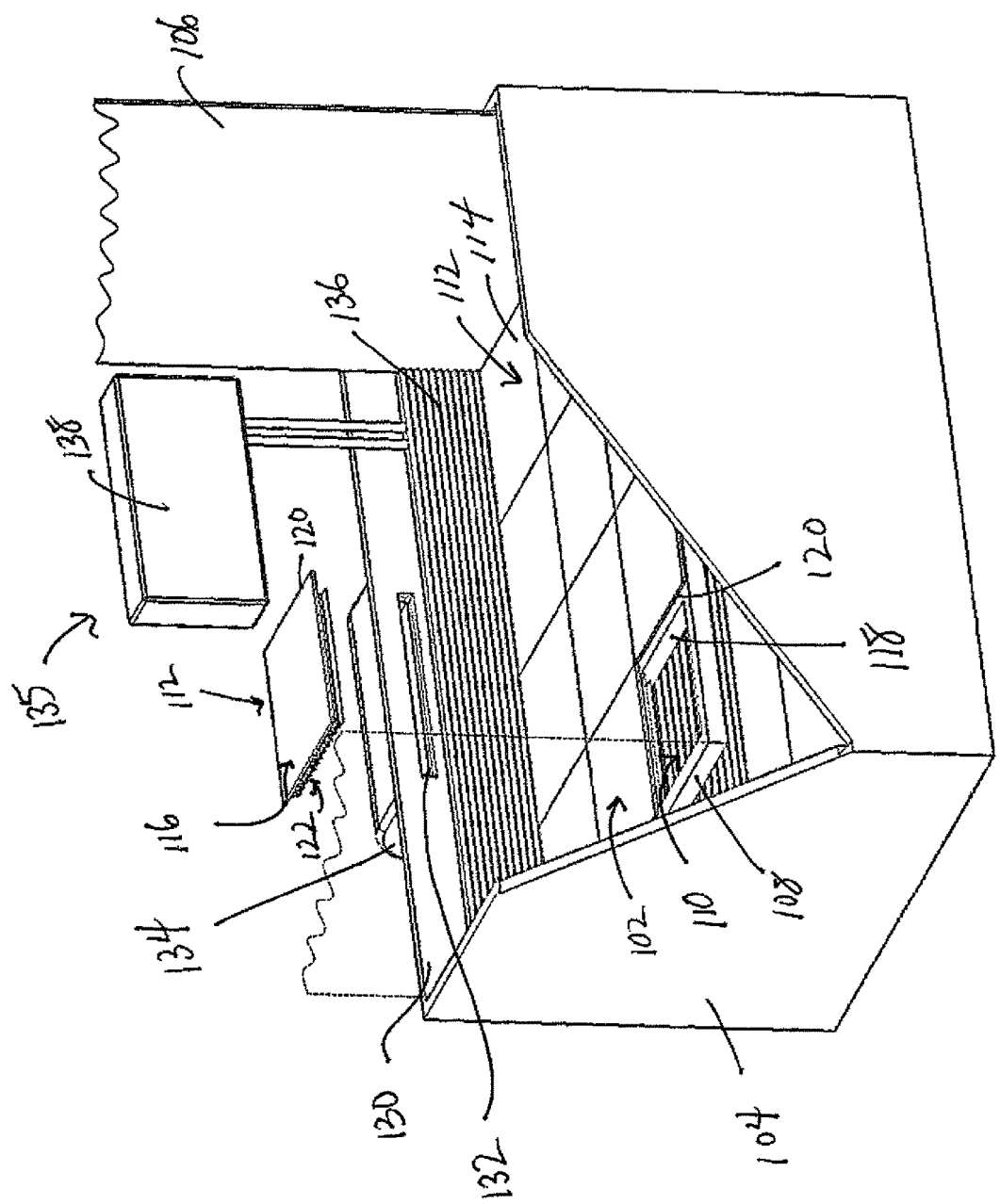
FIG. 6 illustrates another embodiment of a portion of a fabrication system.

FIG. 6 illustrates an embodiment of the fabrication system 1 including a build table 102 disposed within a tank 104. The tank 104 is filled with a quenchant and the build table 102 is lowered into the tank 104 by supports 106, as previously described. In this embodiment, the build table 102 includes a frame 108 which defines a planar support plane. The frame 108 includes a plurality of cutouts 110, each of which is configured to accommodate a removable platen 112 having a build surface 114. The build surface 114 includes non-stick deposition surface including a high-temperature-resistant flat plate 116 which provides a smooth flat plane for the molten and semi molten material being deposited. The flat plate 116 includes a sufficient thickness configured to provide the necessary strength to support the part being fabricated. The shape and size thereof is sufficient to avoid warping when subjected to the heat of deposition. In one or more embodiments, the flat plate 116 includes a copper or a copper alloy.

As can be seen in FIG. 6, each of the cutouts 110 is formed in the frame 108 with crosspieces 118 of appropriate shape to receive one of the platens 112, wherein one or more edges 120 abut an edge 120 of an adjacently located platen 112. In an embodiment, the adjacent edges 120 form a seam that is sufficiently narrow to substantially prevent the heated material from entering the gap between the adjoining platens 112. While a table 102 having twelve cutouts 110 is illustrated, the present disclosure is not limited to a table 102 having twelve cutouts, and more or less cutouts of varying sizes are possible.

Figure 7:
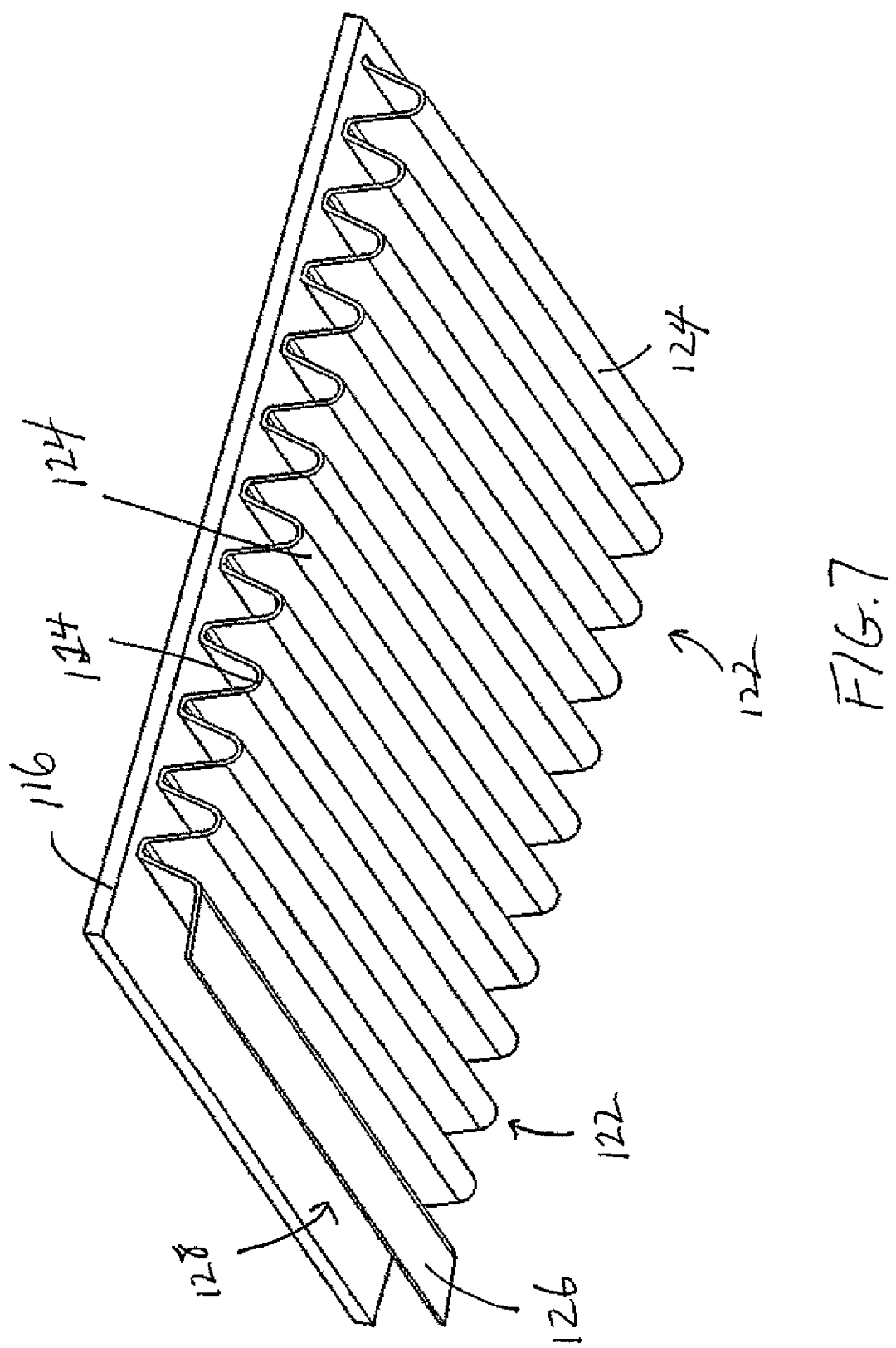
FIG. 7 illustrates an underneath perspective view of a platen assembly.

As seen in FIG. 6 and FIG. 7, platens 112 include a flat plate 116. Fixedly attached to the underside surface of the flat plate 116 is a plurality of heat dissipating fins 122. Each of the fins includes a length sufficient be in contact with the quenchant 10 and in sufficient quantity to draw the heat from the flat plate 116 and to dissipate the heat into the quenchant 10. The length of the fins 122, extending from the underside surface of the flat plate 116, is such that when the build table 102 is in the uppermost position, the ends of the fins 124 are immersed in the quenchant 10. In this manner, the quenchant 10 is below the surface 114 of each of the flat plates 116 and does not interfere with the deposition. The number and length of the fins 124 can vary and still achieve the desired heat transfer.

As further illustrated in FIG. 7, the plate includes an engaging portion 126, which in the disclosed embodiment, is formed as part of the fin structure. Different engaging structures are possible. The engaging portion defines a channel 128, between the flat plate 116 and the engaging portion 126, and is configured to receive a portion of the frame 108, which in the embodiment of FIG. 6 is a portion of one of the crosspieces 118. In this way, each of the platens 112 is forced into maintaining good electrical contact with the table 102 during the formation of a part to provide the electrical connection to strike and maintain a consistent arc.

Referring again to FIG. 6, the tank 104 includes a back wall 130 having a horizontally located rectangular aperture 132, also known as a weir, which provides for the overflow of quenchant through the aperture 132 and into an overflow reservoir 134. The overflow reservoir 134 includes a capacity sufficient to collect overflow of quenchant as the table 102 and the part being formed are lowered into the tank 104. The aperture 132, therefore, provides precise fluid level control of the quenchant remaining in the tank 104. The quenchant in the overflow reservoir 134 is cycled back into the tank for circulation and then pumped back into the tank 104 when the build is complete.

A heat exchanger 135 includes a radiator 136, located at the back wall 130, and a fluid exchange device 138, fluidically coupled to the radiator 136. The fluid exchange device 138 includes a pump which circulates a temperature controlled fluid, such as a refrigerant, through the radiator 136 thus cooling the quenchant located in the tank 104. In one or more embodiments, a sensing device is immersed in the quenchant to determine the temperature of the quenchant. Eliminating the heat exchanger 135 and circulating the quenchant through the fluid exchange device is equivalent.

The fluid exchange device 138 is configured to adjust the temperature of the temperature controlled fluid moving through the radiator 136. The temperature of the quenchant 10 located in the tank 104 is thereby raised or lowered to provide a temperature for controlling the temperature of the part being formed. In this way, the build process is optimized for providing usable parts having the desired properties.

Figure 8:
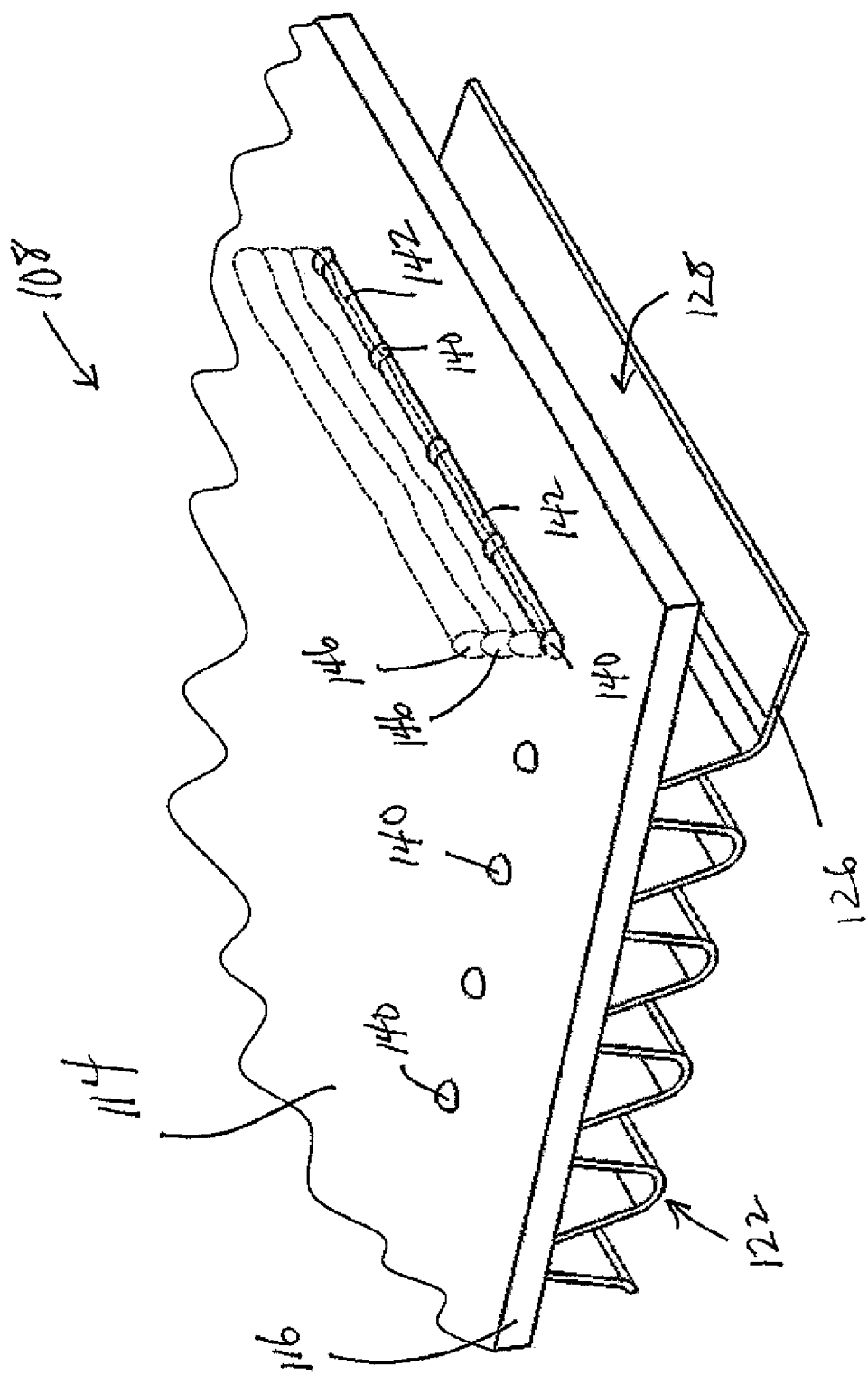
FIG. 8 illustrates a top perspective view of a platen assembly including deposition of material.

FIG. 8 illustrates a portion of the platen 108 including the flat plate 116 defining the surface 114. As described above, the surface 114 includes a non-stick deposition surface which provides a smooth flat plane for the molten and semi molten material being deposited. Using the deposition nozzle module 30 of FIG. 1 including the deposition nozzle assembly 63, a part is formed through the deposition of molten or semi-molten metal or metal-like material at the surface 114. To begin the formation of the part, a plurality of spots 140 of the material are deposited at spaced locations on the surface 114. To deposit the spots 140, the power supply 35 is adjusted to deliver a current to the nozzle assembly 63 which is sufficient to adhere the spots 140 to the surface 114, in a relatively secure fashion, such that a metal bond is formed between the surface material and the deposited spot material. If the plate 116 is formed of copper, for instance, the power is adjusted sufficiently to break through the oxidation at the surface to provide good, consistent, electrical contact.

Each of the spots 140 includes a mound of material, which provides a stable structure electrically connected to the plate 116 upon which the remainder of the part is formed. Once the spots 140 are deposited, a bead of molten or semi-molten metal or metal like material 142 is deposited between each of the spots 140 to connect one spot 140 to the next spot 140 or alternatively over or next to the spots 140. In forming the beads 142, the power of the power supply is adjusted to provide a current typically lower than the current used to form the spots 140. In this fashion, the beads 142 do not form a metal bond with the surface 114, but do form a bond with the spots 140. Once a first layer 144 of the part, including spots 140 and beads 142 are formed, additional layers 146 formed of continuous beads of material are deposited on previously formed layers, as described above. As a result, the deposition nozzle assembly 63 does not act as a welder, but instead is used to merely melt the metal wire fed through the nozzle. The power does not bond the metallic beads 142 to the no stick plate 116. The application of the beads 142 are either continuous or segmented as illustrated and is varied depending on the spacing of the spots 140 and other parameters including sensed temperatures, material types, and speed of deposition.

The part is easily removed from the build surface 114 by tapping the part or the build surface or by the application of a minor impact force to the part or build surface.

The power setting of the power supply 35 during the deposition of the beads 142 and subsequent layers 146 is not at a level typically used in a metal to metal welding process, but is reduced from that level and is generally a fraction of that used in a typical welding process. In one embodiment, the power level being used is approximately twenty five percent or less than the power typically required in a welding operation for the same metal. The power supply setting can also be adjusted to vary the current or voltage used to form the layers in response to the temperature being sensed by the temperature sensor 66. For instance, as additional layers are formed, the temperature being sensed changes due to part geometry and the power supply setting is adjusted accordingly. In the one or more embodiments, the polarity of the electrode of the nozzle assembly 63 is alternated from positive to negative depending on the layer and material of deposition. To facilitate the change in polarity, a silicon controlled rectifier (SCR) is used within the wire feed circuit of the nozzle assembly and build table to change polarity as necessary.

The controller 50 is configured to control the application of the material being deposited by the nozzle module 30 during formation of a part. The controller includes one or more computer processors configured to operate according to software based routines which are written to implement the embodiments of the invention. Whether implemented as part of an operating system or a specific application, component, program, object, module or sequence of instructions the software routines are hereafter referred to herein as "computer program code", or simply "program code". The computer program code typically comprises one or more instructions that are resident at various times in various memory and storage devices in the controller, and that, when read and executed by one or more processors in the controller, causes the robotic actuators, welding power supply, and chilling device to perform the steps necessary to execute formation of the object or parts.

In addition, it should be appreciated that the method or methods described herein are implementable in various program code and should not be limited to specific types of program code or specific organizations of such program code. Additionally, in view of the typically endless number of manners in which computer programs may be organized into routines, procedures, methods, modules, objects, and the like, as well as the various manners in which program functionality may be allocated among various software layers that are resident within a controller or computer if used, (e.g., operating systems, libraries, APIs, applications, applets, etc.), it should be appreciated that the invention is not limited to a specific organization.

The controller 50 and resident program code is configured to form a 3 dimensional metallic part of any shape through the control of a number of parameters and conditions including material temperatures, hold times, deposition speed, tool identification, and power settings of the power supply to optimize deposition rates for a given layer of the part. In addition, as described herein different materials and different wire sizes can be used, either in a single nozzle assembly or in multiple nozzle assemblies which are changed by hand or automatically in the system 1. Weld parameters and temperature sensor emissivity is also controllable for different materials.

Figure 9:
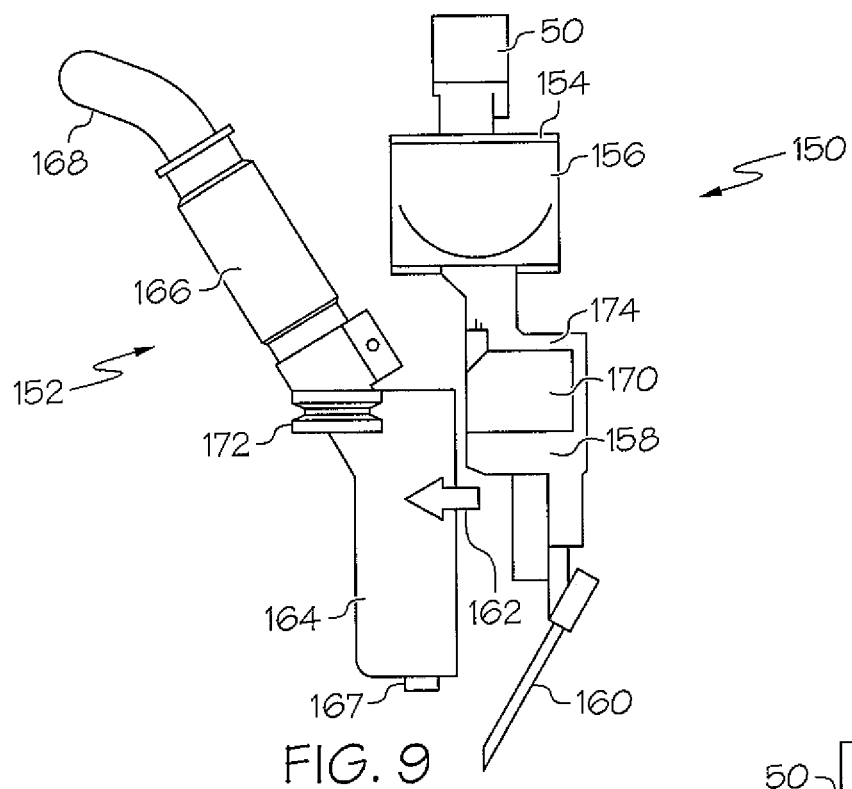
FIG. 9 illustrates a side view of a nozzle head fixture and a nozzle assembly.

FIG. 9 illustrates a side view of an embodiment of a nozzle head fixture 150 and a nozzle assembly 152. The nozzle head fixture 150 is configured to engage a plurality of different nozzle assemblies 152, each of which is directed to forming a bead of material of a different type. For instance, a plurality of nozzle assemblies 152 are parked at a docking station (not shown) for intermittent use during the formation of a part. One of the nozzle assemblies 152 is selected by the controller 50, based on the type of material to be deposited, and that nozzle assembly 152 is picked by the nozzle head fixture 150 from the appropriate location of the docking station where the pick is made. The nozzle head fixture 150 is coupled to the Z axis actuator 21 Z-rod 50 of FIG. 1 which in turn is coupled to wrist actuator 156. The wrist actuator 156 is configured to rotate the head fixture 150 about the z-axis defined by the z-rod 50. A temperature probe 160, such as that previously described, is coupled to the nozzle head fixture 150 and is configured to sense the temperature of the product being formed. In another embodiment, each of the nozzle assemblies includes a temperature probe. A tool bracket 164 which is coupled to a torch portion 166 of the nozzle assembly 152. A nozzle head 167 extends below the tool bracket 164. A flexible conduit 168 coupled to the torch portion 166 supplies the predetermined type of wire and gas. The master bracket 158 includes an aperture 170 configured to receive a portion of the tool bracket 164. As seen in FIG. 9, the tool bracket 164 includes a channel 172 configured to hang the tool from the docking station or other storage rack when not in use. In one or more embodiments, the storage rack is located within the enclosure 40.

Figure 10:
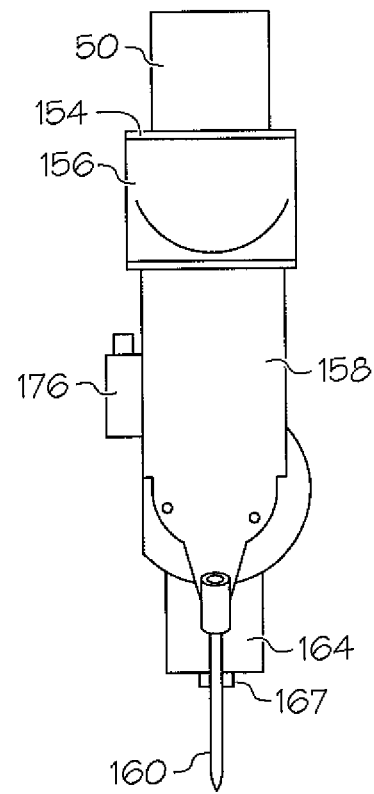
FIG. 10 illustrates a back view of a nozzle head fixture and a docked nozzle assembly.

FIG. 10 illustrates a back view of the nozzle head fixture 150 and the nozzle assembly 152. The nozzle head fixture 150 is configured to support a position sensor 176.

Figure 11:
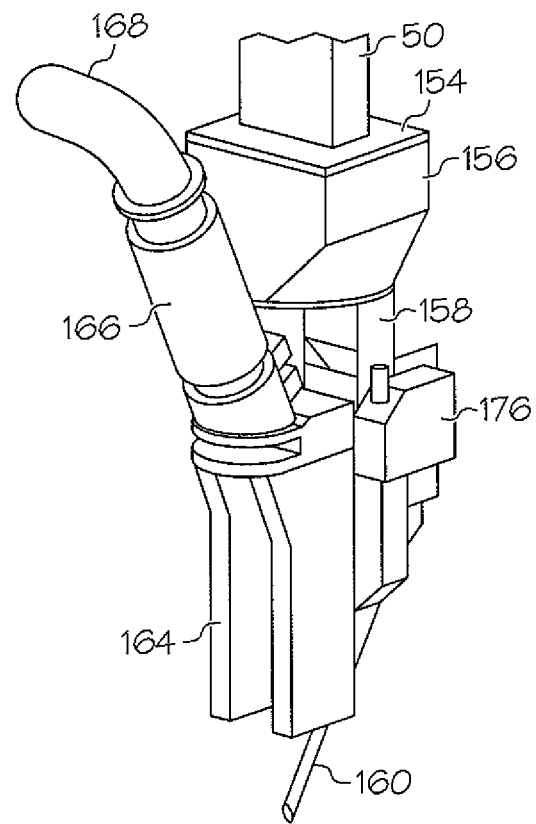
FIG. 11 illustrates a front perspective view of a nozzle head fixture and a docked nozzle assembly.

FIG. 11 illustrates a front perspective view of the nozzle head fixture 150 and the docked nozzle assembly 152. As can be seen, the beam of the temperature sensor extends below the bottom edge of the tool bracket 164.

Figure 12:
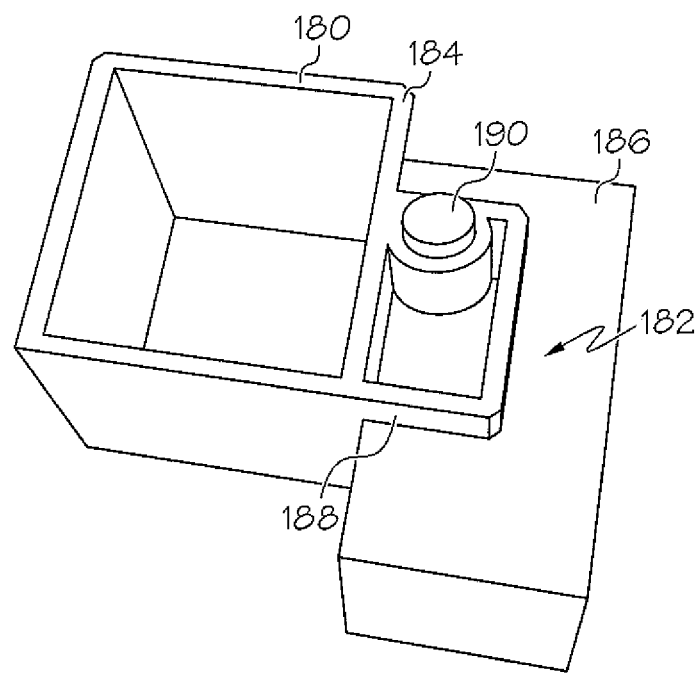
FIG. 12 illustrates a perspective view of a part being formed with a part fixture.

FIG. 12 illustrates a perspective view of a part 180 being formed with a part build fixture 182. The part build fixture 182 is located adjacently to a side 184 of the part 180 and includes a non-stick surface 186 upon which a shelf 188 is formed by the deposition process. The part fixture 182 provides support for the shelf 188 such that the shelf 188 extends from the wall 184 in a cantilever and accurate fashion. Removal of the part fixture 182, after completion of the part 180 leaves a space or void below the shelf 188. Additionally, a specially made form 190 of non stick material is added to during formation, as needed, to provide a desired geometry to the finished part 180. Alternatively, cavities, elevated surfaces and smooth surfaces are similarly formed. The use of such fixtures and forms provides for a more accurate control of the geometric shapes, dimensional sizes and finishes of the objects being formed. In the one or more embodiments, however, the formation of overhangs, arches and similar structures are formed without the use of supplemental supports. The formation of these types of structures are provided with the addition of one additional axes of movement which enables the nozzle to be angled upwards through an selectable and controlled angle of 90 degrees or more to enable the deposition of material in a horizontal direction, a direction angled from horizontal, or upwards from horizontal.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. An additive manufacturing apparatus to fabricate metal objects by depositing metal materials in three dimensions comprising:
   a build table;
   a deposition head configured to deposit the metal objects on a top surface of the build table;
   a multi-axis robotic system configured to support the deposition head;
   the deposition head supported by the multi-axis robotic system actuator to deposit one or more metal materials in layers;
   the multi-axis robotic system further configured for movement in a first plane, at least one axis controlled for independent movement in a first axis perpendicular to the first plane;
   wherein the build table is controlled for independent movement in the first axis perpendicular to the first plane independent of the multi-axis robotic system such that temperature of the metal objects are controlled during fabrication while building layers using quenchant fluid to heat or cool the metal objects as each new layer is deposited.

2. The apparatus of claim 1, wherein the build table comprises a support frame and a plurality of platens.

3. The apparatus of claim 1, wherein said build table is configured to be adjustably located in a tank, said tank having the quenching fluid therein and comprising said means to deliver the quenching fluid, such that said build table is submergible in the quenching fluid during fabrication of the metal objects.

4. The apparatus of claim 1, wherein the deposition head includes comprises a wire-fed nozzle controlled by said multi-axis robotic system to discharge one of a molten and semi-molten material configured to form the metal objects on the build table.

5. The apparatus of claim 1, wherein the deposition head is configured to generate an electric current, said build table comprising a platen having a conductive surface configured to provide a current flow from the deposition head to the conductive surface such that one of the molten and semi-molten material forms an electrically conductive bond with the conductive surface.

6. The apparatus of claim 1, wherein said deposition head comprises a wire-fed nozzle comprising a welding head configured to provide material from a wire delivered to the welding head.

7. The apparatus of claim 1, wherein said quenching fluid is cooler than the metal objects.

8. The apparatus of claim 2, further comprising a height sensor configured to determine a distance between the metal objects being a 6 formed and the deposition head.

9. The apparatus of claim 3, wherein the build table is controlled by said multi-axis robotic system to be adjustably located in the tank such that the metal objects are controllably submerged in the quenching fluid during fabrication of the metal objects and a portion of the metal objects being formed is not submerged in the quenching fluid.

10. The apparatus of claim 3, wherein said build table is submergible in said quenching fluid during fabrication of the metal objects based upon the measured temperature of the metal objects.

11. The apparatus of claim 4, wherein the deposition head is configured to generate a current and the build table includes an electrically conductive surface configured to provide a current flow from the deposition head to the electrically conductive surface such that one of the molten and semi-molten material forms an electrically conductive bond with the electrically conductive surface.

12. The apparatus of claim 5, wherein said means to deliver the quenching fluid comprises a tank configured to hold a quenchant, wherein the build table is controlled to be adjustably located in the tank such that the build table is submerged in the quenchant during fabrication of the metal objects and a portion of the metal objects being formed not submerged in the quenchant during fabrication of the metal objects.

13. The apparatus of claim 6, wherein the wire includes a reduced amount of silicon of approximately five/tenths of one percent or below.

14. The apparatus of claim 6, wherein said wire comprises at reduced amount of silicon.

15. The apparatus of claim 9, further comprising an actuator rod coupled to the deposition head and the multi-axis robotic positioning system, the actuator rod configured to adjust a location of the deposition head in a first axis.

16. The apparatus of claim 9, further comprising a temperature sensor detecting the temperature of the metal objects operatively connected to the head fixture.

17. The apparatus of claim 15, wherein the deposition head includes a wire-fed nozzle configured to discharge one of a molten and semi-molten material configured to form the metal objects.

18. The apparatus of claim 11, wherein said build table comprising a support and a plurality of removable platens, wherein said support comprises a plurality of cutouts configured to receive said plurality of removable platens.

19. The apparatus of claim 18, wherein said build table and said electrically conductive surface comprise said a plurality of removable platens, said removable platens comprising a nonstick deposition surface configured to receive one of the molten and semi-molten materials.

20. The apparatus of claim 19, wherein said means to deliver the quenching fluid comprises a tank configured to hold a quenchant, wherein the build table is controlled by said multi-axis robotic system to be adjustably located in the tank such that a portion of the object is submerged in the quenchant during fabrication of the metal objects and a portion of the metal objects being formed is not submerged in the quenchant during fabrication of the metal objects.

21. The apparatus of claim 20, further comprising an actuator rod coupled to the deposition head and the multi-axis robotic positioning system, the actuator rod configured to adjust a location of the deposition head in a first axis perpendicular to said first plane.

22. The apparatus of claim 13, further comprising at least one of a platen configured to be supported by the build table, the platen comprising an electrically conductive non-stick deposition surface configured to receive one of the molten and semi-molten materials and one or more heat dissipating fins disposed on a side of the platen opposite the non-stick deposition surface.

23. An additive manufacturing apparatus to fabricate metal objects by depositing metal materials in three dimensions comprising:
   a build table;

a plurality of deposition heads configured to deposit the metal objects on a top surface of said build table, wherein each of the deposition heads includes a tool bracket;

a multi-axis robotic system configured to support the deposition head comprising a master bracket configured to support the tool bracket of one of the plurality of deposition heads, the multi-axis robotic system further configured for movement in a first plane;

at least one axis controlled for independent movement in a first axis perpendicular to said first plane;

wherein said build table is controlled for independent movement in said first axis perpendicular to said first plane independent of said multi-axis robotic system such that temperature of said metal objects are controlled during fabrication while building layers using quenchant fluid to heat or cool the metal objects as each new layer is deposited.

24. The apparatus of claim 23, wherein the build table is configured to be adjustably located in a tank such that the build table is submerged in the quenchant fluid during fabrication of the metal objects and a portion of the metal objects being formed is not submerged in the quenchant fluid during fabrication of the metal objects.

25. The apparatus of claim 23, wherein one of the plurality of deposition heads is coupled to the head support, and the other of the plurality of deposition heads are located at a storage location.

26. The apparatus of claim 23, further comprising a temperature sensor detecting the temperature of the metal objects operatively connected to the head support.

27. The apparatus of claim 23, further comprising a height sensor configured to determine a distance between the metal objects being formed and the deposition head, wherein the height sensor is operatively connected to the head support.

28. The apparatus of claim 23, further comprising an enclosure surrounding the multi-axis robotic system and operatively connected to the tank and configured to provide a controlled enclosed space to maintain a gas within a space.

29. The apparatus of claim 28, wherein the gas provides an inert atmosphere to fabricate the metal objects.

* * * * *